United States Patent
Marupaduga et al.

(10) Patent No.: US 8,913,494 B1
(45) Date of Patent: Dec. 16, 2014

(54) DYNAMIC ALLOCATION OF BACKHAUL BEARER SERVICES BASED ON LOADING CONDITIONS

(71) Applicant: Sprint Spectrum L.P., Overland Park, KS (US)

(72) Inventors: Sreekar Marupaduga, Overland Park, KS (US); Rajveen Narendran, Olathe, KS (US); Nicholas Kullman, Kansas City, MO (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 115 days.

(21) Appl. No.: 13/746,889

(22) Filed: Jan. 22, 2013

(51) Int. Cl.
   *H04W 28/00* (2009.01)
   *H04W 28/02* (2009.01)
(52) U.S. Cl.
   CPC ................ *H04W 28/0231* (2013.01)
   USPC .......................... 370/230; 370/329
(58) Field of Classification Search
   USPC ......... 370/230, 230.1, 235, 329, 395.21, 431, 370/468
   See application file for complete search history.

(56) References Cited

U.S. PATENT DOCUMENTS

| | | | |
|---|---|---|---|
| 6,250,150 | B1 | 6/2001 | Azumi |
| 7,120,158 | B2 | 10/2006 | Kyusojin |
| 7,843,816 | B1 | 11/2010 | Zhang et al. |
| 8,135,362 | B2 * | 3/2012 | LaDue ............ 455/126 |
| 8,295,406 | B1 * | 10/2012 | Sorrells et al. ............ 375/340 |
| 2006/0258353 | A1 * | 11/2006 | Makela et al. ............ 455/435.2 |
| 2010/0322069 | A1 * | 12/2010 | Song et al. ............ 370/229 |
| 2012/0224536 | A1 * | 9/2012 | Hahn et al. ............ 370/328 |
| 2012/0320743 | A1 * | 12/2012 | De Roucy et al. ............ 370/230 |
| 2013/0051309 | A1 * | 2/2013 | Van Phan et al. ............ 370/315 |
| 2013/0182570 | A1 * | 7/2013 | Wang ............ 370/235 |

\* cited by examiner

*Primary Examiner* — Brian D Nguyen (57) ABSTRACT

A method and system for dynamically allocating backhaul bearer service based on network loading conditions to help use backhaul-network resources more efficiently. A RAN detects an event relating to bearer service establishment for a given application. Then the RAN identifies a standard bearer service for the given application, where the standard bearer service has a first quality of service. After detecting the event, the RAN determines that a load of the backhaul communication network does not exceed a load threshold. Then, based on the determination that the load of the backhaul communication network does not exceed the load threshold, the RAN selects a bearer service for the given application, where the selected bearer service has a second quality of service that is higher than the first quality of service. Next, the RAN causes the selected bearer service to be established.

20 Claims, 5 Drawing Sheets

DYNAMIC ALLOCATION OF BACKHAUL BEARER SERVICES BASED ON LOADING CONDITIONS

BACKGROUND

Unless otherwise indicated herein, the materials described in this section are not prior art to the claims and are not admitted to be prior art by inclusion in this section.

Many people (or "subscribers") use mobile devices, such as wireless telephones, wireless e-mail devices, wirelessly-equipped computers (such as handheld, tablet, or laptop computers), or other types of wireless communication devices, to communicate with one or more Radio Access Networks (RANs). A typical RAN includes one or more base stations that radiate to provide wireless-communication service to mobile devices within a given geographical coverage area. Depending on the specific underlying technologies and architecture of a given wireless communication system, various RAN elements may take different forms. In a code division multiple access (CDMA) system configured to operate according to IS-2000 and IS-856 standards, for example, the base station is usually referred to as a base transceiver system (BTS). In a universal mobile telecommunications system (UMTS) configured to operate according to Long Term Evolution (LTE) standards, however, the base station is usually referred to as an eNodeB. Other examples exist as well.

A typical RAN also includes a number of additional network elements that communicate with one another and/or the base station and that thereby enable mobile devices to communicate with one or more remote packet-switched networks. Such additional network elements may include, for example, a mobility management entity (MME), a serving-gateway (SGW), and/or a packet-gateway (PGW), among other examples. The communication path that includes the network elements that enable a mobile device to communicate with a remote packet-switched network is sometimes referred to as a "backhaul communication network," or "backhaul" for short.

In operation, the RAN generally establishes one or more bearer services for managing communications between mobile devices and packet-switched networks over the backhaul. Broadly, bearer services can be classified into two categories based on the nature of the quality of service (QoS) they provide. First, Minimum Guaranteed Bit Rate (GBR) bearer services have an associated GBR value for which dedicated network resources (such as bandwidth, resource blocks, timeslots, and transmission power, among other examples) may be permanently allocated at the time the bearer service is established. Second, Non-GBR bearer services generally do not guarantee any particular bit rate. For Non-GBR bearer services, network resources are not typically allocated permanently.

A mobile device may run multiple applications (such as conversational voice, streaming video, WWW, e-mail, and FTP, among other examples) at a given time, and each such application may have different QoS requirements. In order to support multiple QoS requirements, different respective bearer services may be established, each having a different QoS. Thus, the respective bearer service that is established for a given application is typically established based on the application itself. For instance, GBR bearer services are normally used for various "high-priority" applications including, for instance, voice-over IP (VoIP) or conversational video streaming. On the other hand, non-GBR bearer services are normally used for relatively "low-priority" applications such as web browsing or FTP transfer. The bearer service that is normally used for a given application may be referred to as the "standard bearer service" for the given application.

Overview

As a general matter, allocation of bearer services based only on the application for which the bearer service is allocated may result in under-utilization of available network resources. For instance, if the standard bearer service for a given application is a Non-GBR bearer service, the RAN might allocate only a Non-GBR bearer service despite being capable of facilitating GBR bearer service for the given application.

Disclosed herein is a method and system for dynamically allocating backhaul bearer service based on network loading conditions to help use backhaul network resources more efficiently. The method and system disclosed herein may help improve the QoS of some bearer services provided on the backhaul.

According to the disclosure, the RAN may allocate, for a given application, a bearer service that has a higher QoS than the QoS of the application's standard bearer service when there are sufficient available resources on the backhaul to do so. To help ensure such resources are available, the RAN may determine that a load (e.g., an amount of current or anticipated backhaul traffic) of the backhaul is sufficiently low, or does not exceed a load threshold. Then the RAN may select a bearer service that has a QoS that is higher than the QoS of the standard bearer service for the given application. The RAN may then cause the selected, higher QoS, bearer service to be established for the given application on the backhaul.

In one respect, for instance, disclosed is a method that may be implemented by a RAN to dynamically allocate backhaul bearer service based on network loading conditions. The method involves the RAN detecting an event relating to bearer service establishment for a given application. Then the RAN identifies a standard bearer service for the given application, where the standard bearer service has a first QoS. After detecting the event, the RAN determines that a load of the backhaul communication network does not exceed a load threshold. Then, based on the determination that the load of the backhaul communication network does not exceed the load threshold, the RAN selects a bearer service for the given application, where the selected bearer service has a second QoS that is higher than the first QoS. Next, the RAN causes the selected bearer service to be established.

In practice, the RAN may carry out the above method when establishing a new bearer service. Thus, the RAN detecting the event relating to bearer service establishment may involve the RAN receiving, from a mobile device, a request to establish bearer service. Alternatively, the RAN may carry out the above method when modifying a standard bearer service that the RAN previously established at some time in the past. Thus, the RAN detecting the event related to bearer service establishment may involve the RAN determining that a predetermined amount of time after establishing the standard bearer service has elapsed.

Further, the RAN may determine that the load of the backhaul does not exceed the load threshold based on any suitable network-loading evaluation, or combination of network-loading evaluations. For example, the RAN may determine that an amount of data queued for transmission by one or more network entities on the backhaul does not exceed a particular queued-data threshold. As another example, the RAN may determine that an amount of resource-block usage on the backhaul does not exceed a particular resource-block-usage threshold. And as another example, the RAN may determine that an amount of mobile devices currently served by the RAN does not exceed a particular service threshold. Other examples may exist.

Further still, in one implementation, the standard bearer service may be a Non-GBR bearer service, and the selected bearer service may be a GBR bearer service. Thus, according to the method, the RAN may ultimately establish a GBR bearer service for an application that has a standard bearer service that is a Non-GBR bearer service. Other examples of particular bearer services that the RAN may establish in connection with the method may exist as well.

In another respect, disclosed is a RAN for use in a wireless communication system. The RAN may include a wireless-communication interface, a processor, and data storage comprising program instructions executable by the processor to dynamically allocate backhaul bearer services based on network loading conditions to help more efficiently use backhaul-network resources.

Accordingly, as with the method discussed above, the data storage of the RAN may store program instructions for dynamically allocating backhaul bearer services based on network loading conditions. The program instructions may include instructions for detecting an event relating to bearer service establishment for a given application. In turn, the program instructions may further include instructions for identifying a standard bearer service for the given application, where the standard bearer service has a first QoS, and instructions for, after detecting the event, determining that a load of the backhaul communication network does not exceed a load threshold. The program instructions may further include, based on the determination that the load of the backhaul communication network does not exceed the load threshold, selecting a bearer service for the given application, where the bearer service has a second QoS that is higher than the first quality of service, and then causing the selected bearer service to be established.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of an example communication system in which the present method can be implemented. For purposes of illustration, FIG. 1 may be understood to represent an example network architecture that may be used in an LTE system.

It should be understood, however, that this and other arrangements described herein are set forth only as examples. Indeed, it should be understood that other network architectures could be used. In particular, while for simplicity the examples described herein focus specifically on implementation in an LTE arrangement, other network arrangements and/or air interface protocols (including CDMA, WiMAX, IDEN, GSM, GPRS, UTMS, EDGE, MMDS, WIFI, BLUETOOTH, and other protocols now known or later developed) may be used as well. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
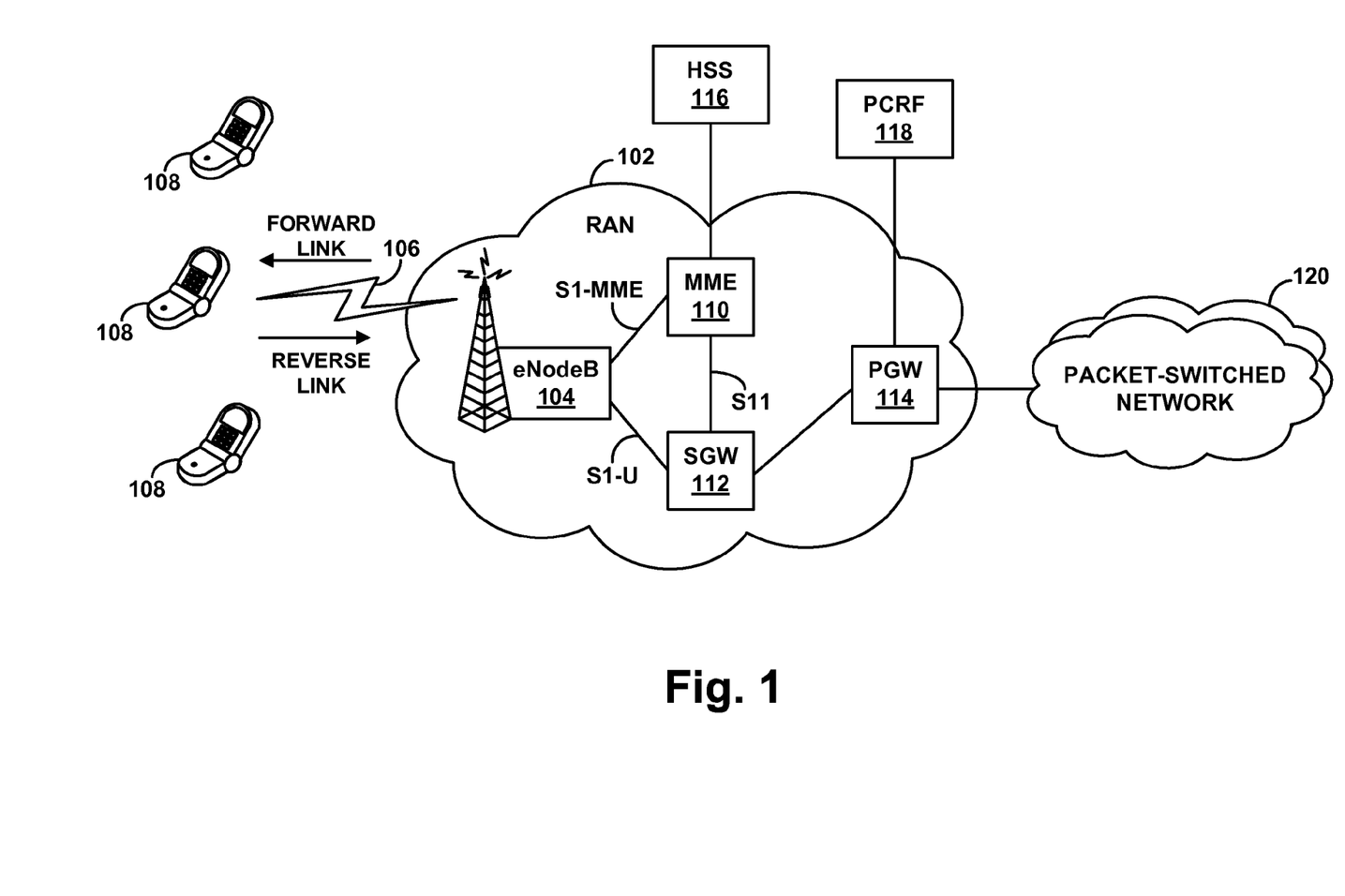
FIG. 1 is a simplified block diagram of a network arrangement in which an example embodiment of the present method and apparatus can be implemented.

FIG. 1 depicts the example communication system as including a RAN 102 having at least one eNodeB 104 that radiates to define a wireless air interface 106 through which the eNodeB may communicate with one or more served mobile devices 108. As noted above, mobile devices 108 could be wireless telephones, wireless e-mail devices, wirelessly-equipped computers (such as handheld, tablet, or laptop computers), or other types of wireless communication devices. In an example LTE embodiment, the wireless communication between eNodeB 104 and mobile devices 108 may involve orthogonal frequency-division multiplexed (OFDM) signals on both the forward link and the reverse link.

As shown, eNodeB 104 is communicatively coupled to LTE mobility management entity (MME) 110, which may function to manage connectivity and security between RAN 102 and mobile devices 108 including, e.g., the establishment, maintenance, and release of bearer services. (Alternatively, in another embodiment, some or all of such functions may be performed by another network entity such as eNodeB 104.) eNodeB 104 is also communicatively coupled to LTE serving-gateway (SGW) 112, which may in turn be communicatively coupled to packet-gateway (PGW) 114 that connects with one or more packet-switched networks 120. SGW 112 generally functions as a mobility anchor for bearer services when, for instance, a given mobile device moves between one or more eNodeBs. SGW 112 may also perform various administrative functions including maintaining bearer-service information for a given mobile device, including when the mobile device is in an idle state. PGW 114 generally functions to enforce QoS requirements, approve and/or direct the establishment of bearer services, and filter downlink data into pertinent bearer services. As shown, the interface (physical or logical network connection) between MME 110 and SGW 112 is known as an S11 interface, the interface between MME 110 and eNodeB 104 is known as an S1-MME interface, and the interface between SGW 112 and eNodeB 104 is known as an S1-U interface.

The network elements of RAN 102 may be communicatively coupled to one or more additional network elements to assist in the performance of any of the functions described herein. For instance, MME 110 may be communicatively coupled to Home Subscriber Server (HSS) 116, which may contain various subscription data used to facilitate allocation of bearer services including QoS parameters, by the MME. Further, PGW 114 may be communicatively coupled to Policy Control and Charging Rules Function (PCRF) 118, which may provide QoS authorization (e.g., QoS class identifier and/or bitrates) functions and may ensure that a given QoS is in accordance with a given mobile device's subscription profile.

As noted, RAN 102 provides connectivity with one or more packet-switched networks 120, which may include the Internet for instance. With this arrangement, a mobile device 108 that is positioned within the coverage area of eNodeB 104 and that is suitably equipped may engage in air interface communication with eNodeB 104 and may thereby communicate with remote entities on the packet-switched network(s) and/or with other mobile devices served by RAN 102.

Figure 2:
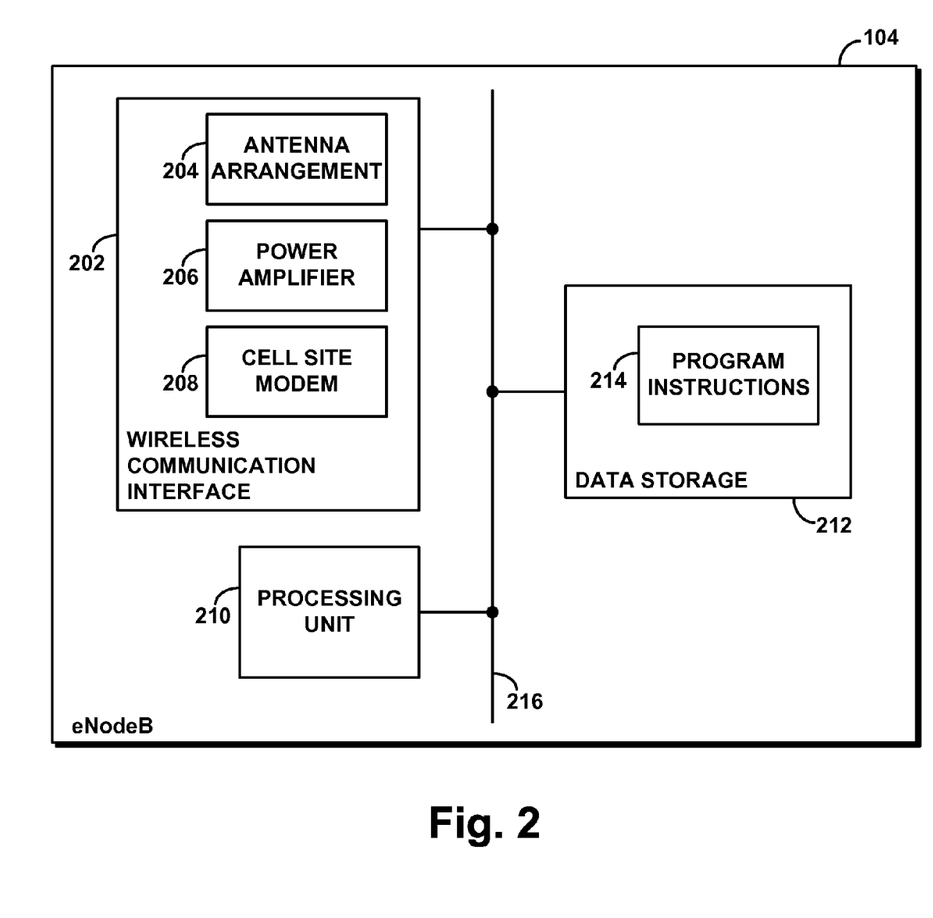
FIG. 2 is a simplified block diagram of an example eNodeB operable in the arrangement of FIG. 1.

FIG. 2 is a simplified block diagram of a representative eNodeB 104, (which may also be a base transceiver station, access node, or access point, in other network arrangements, for instance), illustrating some of the components that can be included in such an entity. As shown in FIG. 2, the representative eNodeB may include a wireless communication interface 202, a processing unit 210, and data storage 212, all of which may be coupled together by a system bus, network, or other connection mechanism 216.

As shown, wireless communication interface 202 may include an antenna arrangement (i.e., antenna structure) 204, which may be tower mounted, and associated components such as a power amplifier 206 and a cell site modem 208 for engaging in air interface communication with mobile devices 108 via the antenna arrangement 204, so as to transmit data and control information to mobile devices 108 and receive data and control information from mobile devices 108. In practice, the eNodeB may allocate various air interface resources for transmission of data from eNodeB 104 to mobile devices 108 on the forward link, and/or from mobile devices 108 to eNodeB 104 on the reverse link.

Processing unit 210 may include one or more general purpose processors (e.g., microprocessors) and/or special-purpose processors (e.g., digital signal processors and/or application specific integrated circuits) and may be integrated in whole or in part with the wireless communication interface. And data storage 212 may include one or more volatile and/or non-volatile storage components, such as magnetic, optical, flash, or other types of non-transitory computer readable media, and may be integrated in whole or in part with processing unit 210.

As shown, data storage 212 may hold (have encoded thereon) program instructions 214, which may be executable by processing unit 210 to carry out various eNodeB or RAN functions described herein, and specifically to cause the eNodeB to carry out such functions. As such, the processing unit 210 programmed with instructions 214 may define part or all of a controller for controlling operation of the eNodeB 104. Alternatively or additionally, however, such control functionality could be provided external to the eNodeB 104, in another RAN entity such as a RAN or eNodeB control entity (for instance, a mobility management entity (MME) in an example LTE arrangement), which may be communicatively linked with the eNodeB and may serve to control certain aspects of eNodeB operation and/or RAN operation generally.

Figure 3:
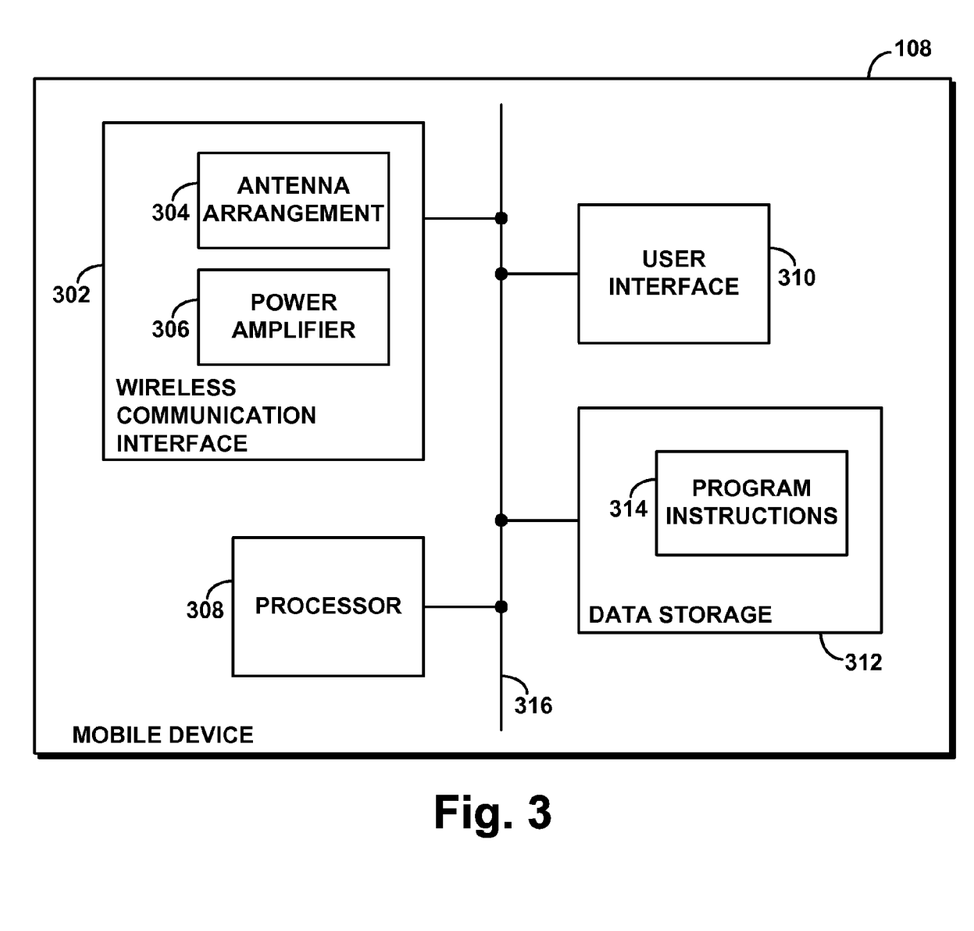
FIG. 3 is a simplified block diagram of an example mobile device operable in the arrangement of FIG. 1.

FIG. 3 is next a simplified block diagram of a representative mobile device 108, illustrating some of the components that can be included in such a device. As shown, the representative mobile device may include a wireless communication interface 302, a user interface 310, a processor 308, and data storage 312, all of which may be coupled together by a system bus, network, or other connection mechanism 316.

Wireless communication interface 302 may comprise an antenna arrangement 304 and associated components such as a mobile device modem for instance, for engaging in communication with serving eNodeBs such as eNodeB 104, such as to transmit data and control information to the eNodeBs and to receive data and control information from the eNodeBs. Further, wireless communication interface 302 may include or be interconnected with a power amplifier 306 that controls the power of air interface transmissions via the antenna arrangement 304.

User interface 310 may facilitate interaction with a user of the mobile device if applicable. As such, the user interface may include output components such as a display screen, loudspeaker, and headphone jack, and input components such as a keypad, a touch-sensitive screen, and a camera. Other examples of user-interface components may exist as well.

Processor 308 may then comprise one or more general purpose processors and/or special-purpose processors and may be integrated in whole or in part with wireless communication interface 302. And data storage 312 may comprise one or more volatile and/or non-volatile storage components and may be integrated in whole or in part with processor 308.

As shown, data storage 312 may hold program instructions 314, which may be executable by processor 308 to carry out various mobile device functions described herein. For instance, in accordance with the program instructions, processor 308 may function to receive control signaling from eNodeB 104 that relates to establishment of bearer services, and/or transmit control signaling that relates to establishment of bearer services.

As a general matter, the RAN helps facilitate connectivity between mobile devices and packet-switched networks with minimal disruption to applications during mobility. Bearer services, such as those generally described above, help route data between the mobile device and packet-switched networks. In particular, such bearer services may be used to route data from the mobile device to the packet-switched networks over the backhaul.

Further, as noted above, a bearer service may be used to manage communications with a defined QoS on the backhaul. Broadly, bearer service can be classified into two categories based on the nature of the QoS they provide. First, Minimum Guaranteed Bit Rate (GBR) bearer services have an associated GBR value for which dedicated network resources may be permanently allocated at the time the bearer service is established. Bit rates higher than the GBR may be allowed for a GBR bearer service if network resources are available. In such cases, a Maximum Bit Rate (MBR) parameter may set an upper limit on the bit rate that is provided by a GBR bearer service. GBR bearer services are typically used for various high-priority applications including, for example, voice-over IP (VoIP) or video streaming, among other examples.

Second, Non-GBR bearer services generally do not guarantee any particular bit rate. For these bearer services, resources are generally not allocated permanently. Non-GBR bearer services are typically used for relatively low-priority applications including, for example, web browsing or FTP transfer, among other examples.

Upon a mobile device initially registering and attaching to a given RAN, a default bearer service may be established in connection with initial registration and assignment of an IP address to the mobile device. The default bearer service is typically a Non-GBR bearer and may be used by the mobile device to carry out various network-signaling functions and/or communications associated with relatively low-priority applications. Nonetheless, after establishment of the default bearer service, multiple applications may run in a mobile device at any time, each one having different QoS requirements. For example, a mobile device might be engaged in a VoIP call while at the same time browsing a web page and/or downloading a FTP file. In order to support multiple QoS requirements associated with such applications, different bearer services may be set up, each being associated with a respective QoS.

Accordingly, after successfully attaching to the network, a mobile device may request services from the network to facilitate use of a given application, including a given bearer service required for use of the given application. To do so, the mobile device may engage in a bearer-establishment procedure with the network.

Figure 4:
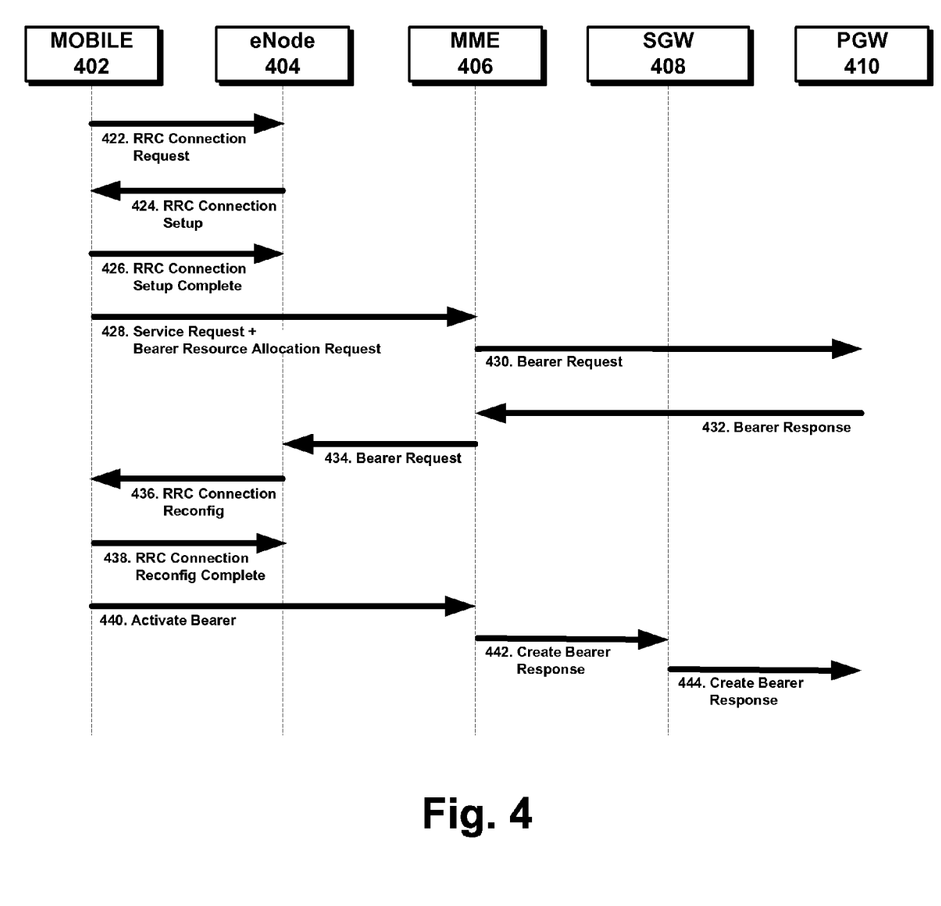
FIG. 4 is a simplified signal-flow diagram of an example bearer-establishment procedure.

FIG. 4 is a simplified signal-flow diagram of an example bearer-establishment procedure. The particular bearer-establishment procedure depicted in FIG. 4 is initiated by mobile device 402 and involves various signals sent to, from, and between, mobile device 402, eNodeB 404, MME 406, SGW 408, and PGW 410. The network elements depicted in FIG. 4 may generally correspond to the respective similar network elements described above with respect to FIG. 1. However, it should be understood that the network elements shown in FIG. 4 are shown for purposes of example and explanation only, and that additional or alternative network elements may be involved in a bearer-establishment procedure. Further, it should be understood that the particular messages depicted in FIG. 4 are set forth for purposes of example and explanation only and that additional and/or alternative messages may be used as well.

As an initial matter, to establish a bearer service, the mobile device first establishes an active Radio Resource Control (RRC) connection with the eNodeB. Thus, in the event such an RRC connection is not already established, mobile device 402 sends RRC Connection Request message 422 to eNodeB 404. RRC Connection Request message 422 may include an identifier of mobile device 402. In response, eNodeB 404 sends to mobile device 402 an RRC Connection Setup message 424 to indicate that the network recognizes mobile device 402 and that the network is able to provide mobile device 402 network services. Mobile device 402 then sends to eNodeB 404 RRC Connection Setup Complete message 426 to acknowledge establishment of the RRC connection.

Next, mobile device 402 sends eNodeB 404 Service Request message 428 and requests bearer service by including a Bearer Resource Allocation Request message. The RAN may identify a particular bearer service (e.g., a standard bearer service) requested by mobile device 402 based on the particular application for which the request for bearer service is made.

Each application that may be run by the mobile device is generally associated with a standard bearer service, and each bearer service that is available on the backhaul may be associated with a particular QoS Class Identifier (QCI). Each QCI may be characterized by various QoS parameters including, for example, priority, packet delay budget, and acceptable packet loss rate, among other such parameters. The QCI label for a bearer service determines how the bearer service is handled. And the QCI label for the bearer service requested by mobile device 402 may be identified by the RAN according to the application for which the request for bearer service is requested. An example set of standard QCIs and their characteristics according to the LTE protocol is provided in Table 1 below.

TABLE 1

| QCI | Resource Type | Priority | Packet delay budget (ms) | Packet error loss rate | Example application |
|---|---|---|---|---|---|
| 1 | GBR | 2 | 100 | $10^{-2}$ | Conversational voice |
| 2 | GBR | 4 | 150 | $10^{-3}$ | Conversational video (live streaming) |
| 3 | GBR | 5 | 300 | $10^{-6}$ | Non-conversational video (buffered streaming) |
| 4 | GBR | 3 | 50 | $10^{-3}$ | Real time gaming |
| 5 | Non-GBR | 1 | 100 | $10^{-6}$ | IMS signaling |
| 6 | Non-GBR | 7 | 100 | $10^{-3}$ | Voice, video (live streaming), interactive gaming |
| 7 | Non-GBR | 6 | 300 | $10^{-6}$ | Video (buffered) streaming |
| 8 | Non-GBR | 8 | 300 | $10^{-6}$ | TCP-based (e.g., WWW, e-mail) chat, FTP, p2p file sharing, progressive video |
| 9 | Non-GBR | 9 | 300 | $10^{-6}$ | — |

After receipt of Service Request message 428, MME 406 may engage in signaling with SGW 408, and/or PGW 410 by way of SGW 408, to communicate Bearer Request message 430 to the remainder of the network entities that make up the backhaul. Bearer Request message 430 generally notifies the remainder of the network entities of the request for bearer service sent by mobile device 402. At this point SGW 408 and PGW 410 allocate the required bearer resources. After allocating the required bearer resources, PGW 410 responds by sending Bearer Response message 432 to MME 406 by way of SGW 408 to indicate that the required bearer resources are allocated. MME 406 then sends Bearer Request message 434 to eNodeB 404 to complete allocation of the required bearer resources between eNodeB 404 and MME 406.

With required bearer resources now allocated between eNodeB 404 and PGW 410, eNodeB 404 sends to mobile device 402 RRC Connection Reconfiguration message 436 to allocate bearer resources for the radio link between eNobeB 404 and mobile device 402. Mobile device 402 establishes the radio bearer resources and responds to eNobeB 404 with RRC Connection Reconfiguration Complete message 438.

To then establish the bearer service using the allocated bearer resources, mobile device 402 sends Activate Bearer message 440 to MME 406 by way of eNodeB 404. MME 406 then sends Create Bearer Response message 442 to SGW 408, and SGW 408 sends Create Bearer Response message 444 to PGW 410, to complete establishment of the bearer service on the backhaul. The bearer service then generally remains active until terminated by a network entity such as mobile device 402 and/or PGW 410.

Thus, based on the example bearer-establishment procedure depicted in FIG. 4, bearer service may be established on the backhaul for a given application. More particularly, the standard bearer service that corresponds to the given application may be established. But, it is possible that, at the time of establishing the bearer service, the backhaul may possess sufficient available network resources to allocate a bearer service that has a higher QoS than the QoS of the standard bearer service. Further, because the standard bearer service may typically remain active until terminated by a network entity, there may come a point in time after establishing the standard bearer service where the backhaul may possess sufficient available network resources to allocate a bearer service that has a higher QoS than the QoS of the standard bearer service.

The example method described herein may help to more efficiently allocate bearer services by evaluating the load on the backhaul and, when available network resources exist, dynamically allocating a bearer service with a higher QoS than the QoS of the standard bearer service. The example method may thereby help improve the QoS of some bearer services provided on the backhaul.

Figure 5:
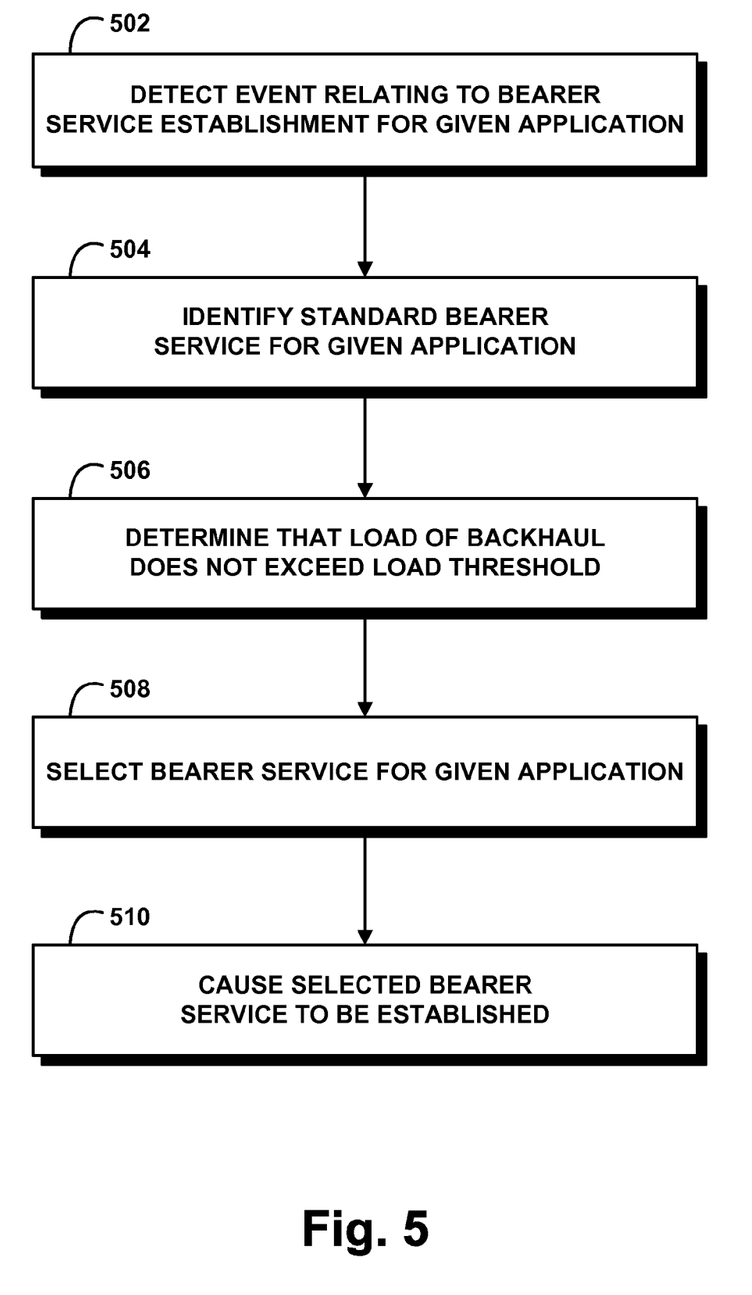
FIG. 5 is a flow chart depicting functions that can be carried out in accordance with an example method.

FIG. 5 is a flow chart illustrating the example method, according to an example embodiment. The example method illustrated in FIG. 5 may be carried out by a RAN that provides service to a mobile device.

The example method involves, as shown at block 502, the RAN detecting an event relating to bearer service establishment for a given application. As shown at block 504, the RAN then identifies a standard bearer service for the given application, where the standard bearer service has a first quality of service. As shown at block 506, after detecting the event, the RAN determines that a load of the backhaul communication network does not exceed a load threshold. As shown at block 508, based on the determination that the load of the backhaul communication network does not exceed the load threshold, the RAN selects a bearer service for the given application, where the selected bearer service has a second QoS that is higher than the first QoS. And, as shown at block 510, the RAN then causes the selected bearer service to be established. Various functions associated with these representative blocks of FIG. 5 are further explained below.

As noted, as shown at block 502, the RAN detects an event relating to bearer service establishment for a given application. As a general matter, the event relating to bearer service establishment may be any suitable event that indicates that new or modified bearer service for a given application is desired, or has otherwise been requested by a mobile device or other network entity.

In one implementation, the RAN detecting the event relating to bearer service establishment may involve the RAN receiving, from a mobile device, a request to establish bearer service. The request to establish bearer service may be transmitted from the mobile device to the RAN over an air interface provided by the RAN. The mobile device may transmit the request to establish bearer service at any suitable time including, for instance, upon attaching to the network or after successfully attaching to the network. For example, the request to establish bearer service may take the form of a Service Request message that includes a Bearer Resource Allocation Request message such as that described above in connection with FIG. 4.

Further, the request to establish bearer service may indicate the given application for which the request is being made. For instance, if the given application involves FTP File Transfer, the request may indicate that the bearer service is required to facilitate an FTP application. Additionally or alternatively, the request to establish bearer service may indicate the standard bearer service and/or associated QCI label associated with the given application. For instance, if the given application involves FTP File Transfer, the request may indicate a standard bearer service associated with a QCI label of "8" as specified by example Table 1 above.

In another implementation, the RAN may detect the event relating to bearer service establishment after already establishing a standard bearer service for the given application. In such an implementation, the RAN may wait a predetermined amount of time after establishing the standard bearer service, and may then proceed to carry out the additional functions associated with the method. In this way, the RAN may periodically "check" to see if sufficient network resources are available to provide a bearer service having a higher QoS than the QoS of the standard bearer service. Thus, the RAN detecting the event relating to bearer service establishment for the given application may involve the RAN determining that a predetermined amount of time after establishing the standard bearer service has elapsed.

Now, with reference to block 504, the RAN identifies a standard bearer service for the given application. The RAN may identify the standard bearer service in any suitable manner. For instance, the RAN may identify the standard bearer service based on information included in a Service Request message (and/or Bearer Resource Allocation Request message), such as that described above, sent by the mobile device. In one example, such a Service Request message may itself identify the standard bearer service. In another example, the Service Request message may identify the given application for which the request is being made, and the RAN may then identify the standard bearer service based on data that associates given applications with respective standard bearer services. An example of such data is provided above in Table 1. Such data may be stored in one or more network entities that are on, or coupled to, the backhaul, such as an eNodeB, MME, and/or PCRF, among other examples.

As noted, the standard bearer service may have a first QoS. The QoS for the standard bearer service may specify, for instance, one or more QoS parameters including a data priority, a packet delay budget, and/or an acceptable packet error loss rate, among other examples. As a general matter, the standard bearer service identified by the RAN may be a non-guaranteed bit rate (non-GBR) bearer service, such as that which is typically associated with relatively low-priority applications including, but not limited to, TCP-based (e.g., WWW, e-mail) chat, FTP, p2p file sharing, and progressive video, among other examples. The standard bearer service may have any other suitable QoS as well.

Now, with reference to block 506, after detecting the event relating to bearer service establishment, the RAN determines that a load of the backhaul communication network does not exceed a load threshold. As a general matter, the RAN may identify whether sufficient available backhaul-network resources exist such that it may be possible to provide a bearer service with a QoS that is generally higher than the first QoS associated with the standard bearer service. Accordingly, for purposes of explanation, various examples of techniques for evaluating the load of the backhaul are described below. It should be understood, however, that these examples are provided for purposes of explanation only, and should not be taken to be limiting. Other examples of techniques for analyzing the load of the backhaul may exist as well.

In one example, the RAN determining that a load of the backhaul does not exceed a load threshold may involve the RAN determining that an amount of queued data does not exceed a queued-data threshold. For instance, one or more RAN network elements (e.g., an eNodeB) may be arranged to schedule transmission of data for a given application on the backhaul. Such scheduling may be carried out for the given application based, at least in part, on the QoS of the bearer service (including, e.g., the priority of the bearer service) associated with the given application. In a situation where application data is scheduled for transmission at some point in the future, the application data may be put in queue according to its respective priority. Thus, the amount of queued data that is present at a given network element (e.g., an eNodeB) at a given point in time may provide an indication of the load of the backhaul. And in a situation where the amount of queued data does not exceed a predetermined threshold, the RAN may determine that there currently exists sufficient available backhaul resources to provide a bearer service with a QoS that is higher than the QoS of the standard bearer service.

In another example, the RAN determining that a load of the backhaul does not exceed a load threshold may involve the RAN determining that an amount of resource-block usage does not exceed a resource-block-usage threshold. For instance, in an LTE implementation that uses Orthogonal Frequency Division Multiplexing (OFDM) in combination with Time Division Multiplexing (TDM) on the uplink, transmission resources may be partitioned in the time-frequency domain. Such time-frequency blocks are typically referred to as Resource Blocks, and may be allocated for a given application based, at least in part, on the QoS of the bearer service (including, e.g., the priority of the bearer service) associated with the given application. Thus, the amount of resource blocks currently in use may provide an indication of the load of the backhaul. And in a situation where the amount of resource blocks currently in use does not exceed a predetermined threshold, the RAN may determine that there currently exists sufficient available backhaul resources to provide a bearer service with a QoS that is higher than the QoS of the standard bearer service.

In yet another example, the RAN determining that a load of the backhaul does not exceed a load threshold may involve the RAN determining that an amount of mobile devices currently served by the RAN does not exceed a service threshold. For instance, as described above with reference to FIG. 1, a RAN may serve multiple mobile devices at a given time. Because such served mobile devices generally cause data to be transmitted on the backhaul, the amount of mobile devices currently served by the RAN may provide an indication of the load of the backhaul. And in a situation where the amount of mobile devices currently served by the RAN does not exceed a predetermined threshold, the RAN may determine that there currently exists sufficient available backhaul resources to provide a bearer service with a QoS that is higher than the QoS of the standard bearer service.

Additionally, or alternatively, before determining that a load of the backhaul communication network does not exceed a load threshold, the RAN may determine that an amount of mobile devices currently served by the RAN does not exceed a service threshold. In this way, the RAN may only devote resources to making the determination that the load of the backhaul does not exceed a load threshold if it first determines that the amount of mobile devices currently served by the RAN does not exceed a service threshold. Doing so may be advantageous for at least the reason that determining that an amount of mobile devices currently served by the RAN does not exceed (or does exceed) a service threshold may be relatively less resource-intensive than other techniques for determining that a load of the backhaul communication network does not exceed a load threshold. And in a case where the service threshold is not exceeded, the RAN may avoid undertaking a further determination of whether a load of the backhaul communication network does not exceed a load threshold.

Further, before determining that a load of the backhaul communication network does not exceed a load threshold, the RAN may determine that a mobile device that controls the given application is associated with a user account that has a QoS that is greater than a QoS threshold. In this way, the RAN may only devote resources to making the determination that the load of the backhaul does not exceed a load threshold if it first determines that a user account associated with the mobile device is permissioned for a predetermined level of QoS. Further, in this way, the RAN may ultimately allocate a bearer service having a higher QoS than the QoS of the standard bearer service if it first determines that a user account associated with the mobile device is permissioned for such an improved QoS.

In an implementation, the RAN may only allocate a bearer service having a higher QoS than the QoS of the standard bearer service if the user account associated with the mobile device is a pre-paid user account. (As a general matter, pre-paid user accounts are accounts for which payment is received prior to providing service.) In such an implementation, therefore, the user account that has a QoS that is greater than a QoS threshold may be a pre-paid user account. On the other hand, post-paid user accounts (i.e., user accounts for which payment is received after providing service) may generally be associated with a QoS that is below the QoS threshold.

Now, with reference to block 508, based on the determination that the load of the backhaul communication network does not exceed the load threshold, the RAN selects a bearer service for the given application. As a general matter, the selected bearer service may have a second quality of service that is higher than the first quality of service. For instance, at least one QoS parameter of the second QoS, such as priority, packet delay budget, and/or packet error loss rate, among other examples, may be higher than the corresponding QoS parameter of the first QoS.

In a particular implementation, the selected bearer service may be a GBR bearer service. Further, as noted above, the standard bearer service may be a Non-GBR bearer service. Thus, in such an implementation, the example method may generally involve improving the bearer service that is established for a given application from a Non-GBR bearer service to a GBR bearer service.

Further, the RAN may select the bearer service based on the given application for which the bearer service was requested. For example, with reference to Table 1 set forth above, for applications having a standard bearer service with a QCI of "8" (such as TCP-based (e.g., WWW, e-mail) chat, FTP, p2p file sharing, and progressive video, etc.), the RAN may select a bearer service having a QCI of "4." As another example, for applications having a standard QCI of "6" (such as Voice, video (live streaming), and interactive gaming, etc.), the RAN may select a bearer service having a QCI of "2." Other examples may exist.

And now, with reference to block 510, the RAN causes the selected bearer service to be established. The RAN may cause the selected bearer service to be established in any suitable manner. In one implementation, the RAN may engage in suitable signaling with various network entities on the backhaul, such as that signaling described above with respect to the bearer-establishment procedure depicted in FIG. 4, so as to cause the selected bearer service to be established. For instance, upon receiving a Service Request message from a mobile device, an eNodeB (in combination with any other suitable network element) may carry out the remaining functions of the method described with respect to FIG. 5, and may ultimately cause the selected bearer service to be established in accordance with the bearer-establishment procedure described with respect to FIG. 4. Alternatively, after a predetermined time since establishing a standard bearer service, an eNodeB (in combination with any other suitable network element) may carry out the remaining functions of the method described with respect to FIG. 5, and may ultimately cause the selected bearer service to be established in accordance with the bearer-establishment procedure described with respect to FIG. 4.

As discussed above, the functions described with respect to FIG. 5 generally involve the allocation of a bearer service for a given application that has a higher QoS than the QoS of the standard bearer service. It is of note that, after carrying out the functions described with respect to FIG. 5, the RAN may then periodically "check" to see if the load of the backhaul has changed such that the bearer service for the given application should be returned (or otherwise set) to the standard bearer service. Accordingly, in a particular implementation, the RAN may determine that a predetermined amount of time after establishing the selected bearer service has elapsed. The RAN may then determine that a load of the backhaul does exceed a load threshold. In such a situation, based on the determination that the load of the backhaul does exceed the load threshold, the RAN may cause the standard bearer service to be established.

Example embodiments have been described above. It should be understood, however, that variations from these embodiments are possible, while remaining within the true spirit and scope of the invention.

We claim:

1. In a communication system comprising a backhaul communication network, wherein the backhaul communication network comprises a radio access network (RAN), a method comprising:
  the RAN detecting an event relating to bearer service establishment for a given application;
  the RAN identifying a standard bearer service for the given application, wherein the standard bearer service has a first quality of service;
  after detecting the event, the RAN determining that a load of the backhaul communication network does not exceed a load threshold;
  based on the determination that the load of the backhaul communication network does not exceed the load threshold, the RAN selecting a bearer service for the given application, wherein the selected bearer service has a second quality of service that is higher than the first quality of service; and
  the RAN causing the selected bearer service to be established.

2. The method of claim 1, wherein the RAN detecting the event relating to bearer service establishment for the given application comprises:
  the RAN receiving, from a mobile device, a request to establish bearer service, wherein the request to establish bearer service indicates the given application and the standard bearer service.

3. The method of claim 2, wherein the request to establish bearer service is a Bearer Resource Allocation Request message.

4. The method of claim 1, wherein the RAN previously established the standard bearer service for the given application, and wherein the RAN detecting the event relating to bearer service establishment for the given application comprises:
  the RAN determining that a predetermined amount of time after establishing the standard bearer service has elapsed.

5. The method of claim 1, wherein the standard bearer service is a non-guaranteed bit rate (non-GBR) bearer service.

6. The method of claim 5, wherein the selected bearer service is a guaranteed bit rate (GBR) bearer service.

7. The method of claim 6, wherein the RAN selecting the GBR bearer service comprises the RAN selecting the GBR bearer service based on the given application.

8. The method of claim 1, wherein the RAN determining that a load of the backhaul communication network does not exceed a load threshold comprises at least one of (i) determining that an amount of queued data does not exceed a queued-data threshold, (ii) determining that an amount of resource-block usage does not exceed a resource-block-usage threshold, or (iii) determining that an amount of mobile devices currently served by the RAN does not exceed a service threshold.

9. The method of claim 1, the method further comprising:
  before determining that a load of the backhaul communication network does not exceed a load threshold, the RAN determining that an amount of mobile devices currently served by the RAN does not exceed a service threshold.

10. The method of claim 1, the method further comprising:
  before determining that a load of the backhaul communication network does not exceed a load threshold, the RAN determining that a mobile device that controls the given application is associated with a user account that has a quality of service that is greater than a quality-of-service threshold.

11. The method of claim 10, wherein the user account is a pre-paid user account.

12. The method of claim 1, wherein the communication system operates according to the Long Term Evolution (LTE) air-interface protocol.

13. A radio access network (RAN) comprising:
  a wireless-communication interface;
  a processor; and
  data storage comprising program instructions executable by the processor for causing the RAN to carry out functions comprising:
    detecting an event relating to bearer service establishment for a given application;
    identifying a standard bearer service for the given application, wherein the standard bearer service has a first quality of service;
    after detecting the event, determining that a load of the backhaul communication network does not exceed a load threshold;
    based on the determination that the load of the backhaul communication network does not exceed the load threshold, selecting a bearer service for the given application, wherein the selected bearer service has a second quality of service that is higher than the first quality of service; and
    causing the selected bearer service to be established.

14. The RAN of claim 13, wherein detecting the event relating to bearer service establishment for the given application comprises:
  receiving, from an mobile device, a request to establish bearer service, wherein the request to establish bearer service indicates the given application and the standard bearer service.

15. The RAN of claim 14, wherein the request to establish bearer service is a Bearer Resource Allocation Request message.

16. The RAN of claim 13, wherein the standard bearer service is a non-guaranteed bit rate (non-GBR) bearer service.

17. The RAN of claim 16, wherein the selected bearer service is a guaranteed bit rate (GBR) bearer service.

18. The RAN of claim 17, wherein selecting the GBR bearer service comprises selecting the GBR bearer service based on the given application.

19. The RAN of claim 13, wherein the instructions further comprise:

before determining that a load of the backhaul communication network does not exceed a load threshold, determining that a mobile device that controls the given application is associated with a user account that has a quality of service that is greater than a quality-of-service threshold.

20. The RAN of claim 19, wherein the user account is a pre-paid user account.

\* \* \* \* \*